United States Patent
Sengoku et al.

(10) Patent No.: US 8,694,199 B2
(45) Date of Patent: Apr. 8, 2014

(54) VEHICLE STATE MONITORING SERVER AND VEHICLE STATE MONITORING SYSTEM

(75) Inventors: Koji Sengoku, Tokyo (JP); Yuichiro Ishido, Tokyo (JP); Tadafumi Nogawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/579,350

(22) PCT Filed: Oct. 15, 2010

(86) PCT No.: PCT/JP2010/068190
§ 371 (c)(1),
(2), (4) Date: Aug. 16, 2012

(87) PCT Pub. No.: WO2011/104926
PCT Pub. Date: Sep. 1, 2011

(65) Prior Publication Data
US 2012/0310471 A1 Dec. 6, 2012

(30) Foreign Application Priority Data
Feb. 23, 2010 (JP) ................................. 2010-037351

(51) Int. Cl.
*G06F 7/00* (2006.01)
(52) U.S. Cl.
USPC ........................................................ 701/31.5

(58) Field of Classification Search
USPC ........................................................ 701/31.5
See application file for complete search history.

(56) References Cited

U.S. PATENT DOCUMENTS

| 4,937,528 | A  | * | 6/1990 | Palanisamy ................... 324/430 |
| 5,381,096 | A  | * | 1/1995 | Hirzel ............................ 324/427 |
| 5,900,734 | A  | * | 5/1999 | Munson ........................ 324/433 |
| 6,424,157 | B1 | * | 7/2002 | Gollomp et al. .............. 324/430 |
| 7,023,216 | B2 | * | 4/2006 | Prema et al. .................. 324/435 |
| 8,159,189 | B2 | * | 4/2012 | Zhang ........................... 320/136 |

FOREIGN PATENT DOCUMENTS

| JP | 2002-171609 | 6/2002 |
| JP | 2003-264906 | 9/2003 |
| JP | 2006-074868 | 3/2006 |
| JP | 2009-137340 | 6/2009 |

OTHER PUBLICATIONS

Machine Translation of JP 2003-264906 published Sep. 19, 2003.*

* cited by examiner

*Primary Examiner* — Mary Cheung
*Assistant Examiner* — Anne Mazzara
(74) *Attorney, Agent, or Firm* — Rankin, Hill & Clark LLP

(57) ABSTRACT

Disclosed is a vehicle state monitoring system in which, when a vehicle (2) has been in a driving stopped state for a reference duration or more, a message is sent to a contact address associated with a vehicular identifier of the vehicle (2). The timing for sending the message may be determined on the basis of an SOC level of a battery (23) identified from vehicle information or estimated on the basis of a length of a last driving duration identified from the vehicle information.

16 Claims, 3 Drawing Sheets

VEHICLE STATE MONITORING SERVER AND VEHICLE STATE MONITORING SYSTEM

TECHNICAL FIELD

The present invention relates to a technical approach for monitoring a state of a battery mounted in a vehicle provided with an electric motor as a prime mover.

BACKGROUND ART

There has been disclosed an approach for managing an electric power of a battery mounted in a hybrid vehicle by using an electric power consumption information of a battery in another vehicle (refer to Japanese Patent Laid-open No. 2009-137340).

SUMMARY OF INVENTION

Technical Problem

However, since the battery is charged according to the operation of an internal combustion engine along with the driving of the hybrid vehicle, if the vehicle has not been driven for a long duration, a remaining amount of the battery mounted in the vehicle decreases beyond an amount of charge, leading to the possibility of deteriorating the performance thereof.

It is therefore an object of the present invention to provide a server and the like in an attempt to reduce the possibility of deteriorating the performance of a battery mounted in a vehicle.

Solution to Problem

To attain an object described above, the vehicle state monitoring system of the present invention provides a vehicle state monitoring server configured to monitor a state of a battery mounted in a vehicle provided with an electric motor as a prime mover. The vehicle state monitoring server of the present invention comprises: a database configured to store a vehicular identifier for identifying the vehicle associated with a contact address of a user of the vehicle in a communication network; a first monitoring-processing element configured to recognize a vehicle information capable of identifying the vehicular identifier of the vehicle and a last driving stopped duration of the vehicle according to network communications; and a second monitoring-processing element configured to send a message to a contact address stored in association with the vehicular identifier of the vehicle by the database on condition that the last driving stopped duration of the vehicle is equal to or longer than a reference duration on the basis of the vehicle information recognized by the first monitoring-processing element.

According to the vehicle state monitoring server of the present invention, if a vehicle has been in a driving stopped state for the reference duration or more, a message is sent to a contact address associated with the vehicle and registered in the database. It is possible to prompt a user to take necessary actions to charge the battery by the message. As a result thereof, it is possible to reduce the possibility that the vehicle has been disposed in the driving stopped state without being noticed by the user for a long duration and the performance of the battery deteriorates due to the decrement of the remaining amount of the battery.

It is acceptable that the first monitoring-processing element is configured to recognize the vehicle information capable of identifying or estimating a remaining amount of the battery mounted in the vehicle and the second monitoring-processing element is configured to determine the reference duration according to the level of the remaining amount of the battery of the vehicle identified or estimated from the vehicle information recognized by the first monitoring-processing element.

According to the vehicle state monitoring server having the mentioned configuration, the message can be sent to a corresponding contact address at an appropriate timing in view of the level of charging necessity so as to prevent the performance deterioration of the battery. As a result thereof, it is possible to reduce the possibility that the vehicle has been disposed in the driving stopped state without being noticed by the user for a long duration and the performance of the battery deteriorates due to the decrement of the remaining amount of the battery.

It is acceptable that the first monitoring-processing element is configured to recognize the vehicle information capable of identifying or estimating a remaining amount of the battery configured to be charged by the driving of the vehicle, and the second monitoring-processing element is configured to determine a driving duration of the vehicle required to increase the remaining amount of the battery to a predefined value as a recommended driving duration according to the level of the remaining amount of the battery identified or estimated from the vehicle information recognized by the first monitoring-processing element, and then to send the message containing the recommended driving duration to a contact address stored in association with the vehicular identifier of the vehicle by the database.

According to the vehicle state monitoring server having the mentioned configuration, the message containing the level of the remaining amount of the battery, consequently the recommended driving duration of the vehicle required to prevent the performance deterioration of the battery can be sent to a corresponding contact address. As a result thereof, it is possible to reduce the possibility that the recovery of the remaining amount of the battery is insufficient due to a too short duration where the vehicle has been driven by the user, preventing the performance of the battery from being deteriorated due to the decrement of the remaining amount of the battery in a vehicle driving stopped duration thereafter.

To attain an object described above, the present invention provides a vehicle state monitoring system having the vehicle state monitoring server and a vehicle control unit mounted in the vehicle.

According to the vehicle state monitoring system of the present invention, a message can be sent to a corresponding contact address at an appropriate time in view of the level of driving necessity of a hybrid vehicle so as to prevent the performance deterioration of the battery.

DESCRIPTION OF EMBODIMENTS (Configuration of a Vehicle State Monitoring System of the Present Invention)

The configuration of a vehicle state monitoring system will be described as one embodiment of the present invention.

Figure 1:
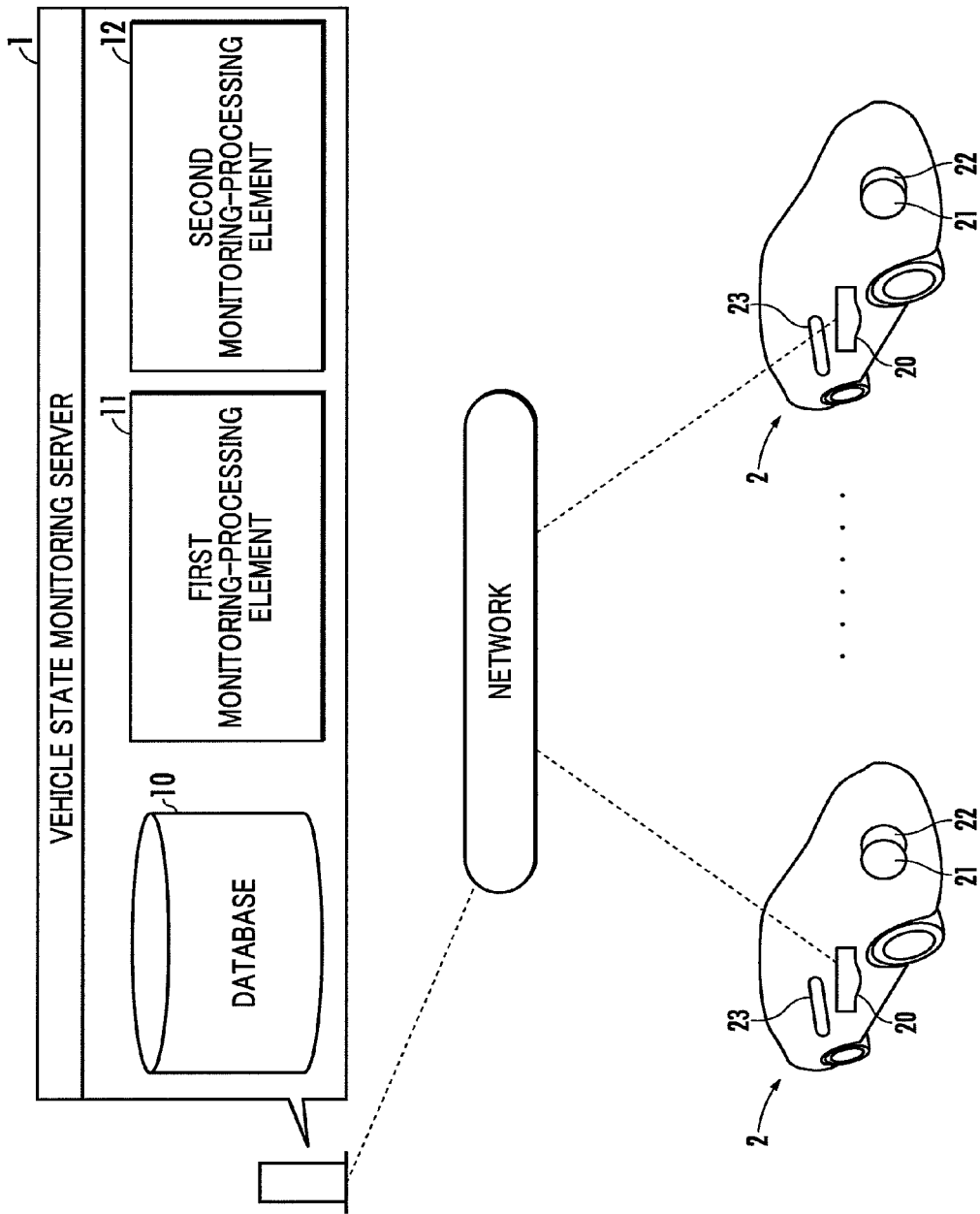
FIG. 1 is a diagram illustrating a configuration of a vehicle state monitoring system of the present invention.

The vehicle state monitoring system illustrated in FIG. 1 is configured to include a vehicle state monitoring server 1 and an ECU (Electronic Control Unit) 20 mounted in a vehicle 2. The vehicle state monitoring server 1 and the ECU 20 can communicate each other via a network.

The vehicle state monitoring server 1 is composed of a database 10, a first monitoring-processing element 11 and a second monitoring-processing element 12.

The database 10 is composed of a storing device or a memory, namely the hardware resource, as a constituent element of the server. The database 10 stores a vehicle identifier for identifying a vehicle in association with a contact address in the network.

As a vehicular identifier, a number, a character or a mark or a combination thereof intrinsic to an individual vehicle such as a vehicle identification number (VIN) or the like, may be adopted. As a contact address in the network, a mail address privately used by a user, a telephone number of a telephone machine owned by a user or the like may be adopted.

Each of the first monitoring-processing element 11 and the second monitoring-processing element 12 is composed of a processor and a memory, namely the hardware resource, as the constituent elements of the server, and is configured to perform an arithmetic computation process to be described hereinafter. It is acceptable that a part of or the entire part of the first monitoring-processing element 11 and the second monitoring-processing element 12 is made of common hardware resources, or the entire part thereof is made of separate hardware resources.

A constituent element of the server 1 being configured to perform an arithmetic computation process means that the processor included in the constituent element is programmed to retrieve a necessary software from the memory at an appropriate timing and perform the arithmetic computation process according to the software.

The vehicle 2 is a hybrid vehicle disposed with an internal combustion engine 21, an electric motor 22 and a battery 23. The internal combustion engine 21 and the electric motor 22, namely the prime mover, are connected to one common axis arm, for example. The vehicle 2 travels by switching among a travel mode powered by the total output from the internal combustion engine 21 and the electric motor 22, a travel mode powered by the output from the internal combustion engine 21 only, and a travel mode powered by the output from the electric motor 22 only. The battery 23 is configured to supply the electric power to the electric motor 22 and to accumulate the regenerative power regenerated by the electric motor 22. The ECU 20 is configured to control operations of apparatuses constituting the vehicle 2, such as switching the travel mode or the like.

(Functions of the Vehicle State Monitoring System)

Descriptions will be carried out on the functions of the vehicle state monitoring system according to the present invention.

Figure 2:
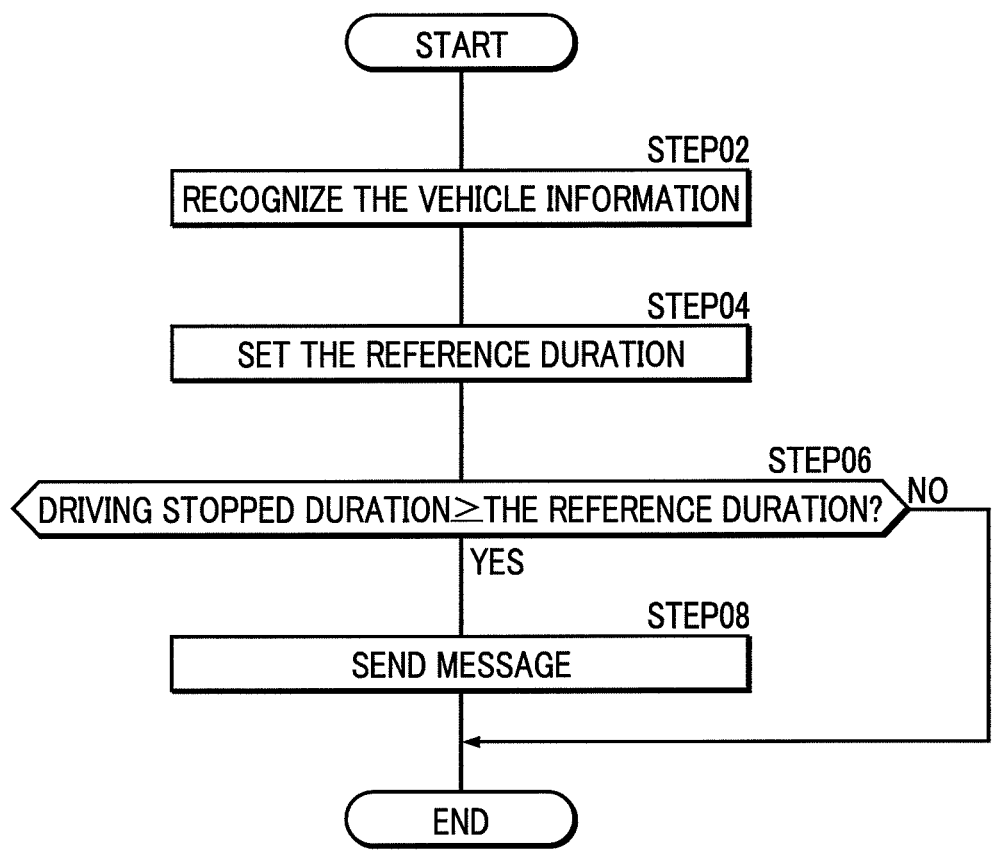
FIG. 2 is an explanatory diagram related to functions of the vehicle state monitoring system of the present invention.

The vehicle information is recognized by the first monitoring-processing element 11 according to the network communications (FIG. 2/STEP 02).

Herein, it is considered that a navigation device having the ECU 20 served as a constituent element possesses a function to determine a position of the vehicle 2 and a function to send a probe information denoting temporarily determined positions of the vehicle 2 to a traffic information management server (not shown). In this case, the probe information received directly from the ECU 20 by the vehicle state monitoring server 1 as the traffic information management server or indirectly through the intermediary of the traffic information management server is recognized by the first monitoring-processing element 11 as the vehicle information (FIG. 2/STEP 02).

The vehicular identifier, and the start time and the end time of the last driving duration of the vehicle 2 are identified from the probe information. For example, in addition to the time where the last determined position of the vehicle 2 is obtained, if the distance from the last determined position of the vehicle 2 to the previous determined position is not greater than a threshold value, it is acceptable that the time where the previous determined position is identified as the end time of the last driving duration.

It is acceptable that the information which has a timing where an IGN switch is switched to ON identified as the start time of the last driving duration and a later timing where the IGN switch is switched to OFF identified as the end time of the last driving duration, and is sent from the ECU 20 of the vehicle 2 directly or indirectly to the traffic information management server is recognized as the vehicle information.

The second monitoring-processing element 12, on the basis of the vehicle information recognized by the first monitoring-processing element 11, performs the following procedure on each vehicle 2 identified according to the vehicular identifier.

First, a reference duration, which is a factor for determining a timing for sending a message prompting necessary actions for charging the battery 23, namely prompting the driving of the vehicle 2, is set (FIG. 2/STEP 04).

The reference duration is set longer as for example the last driving duration of the vehicle 2 identified from the vehicle information is longer. The reason thereof is based on the fact that if the driving duration is longer, the frequency of the power regeneration mode of the vehicle 2 becomes higher; thereby, a remaining amount or an amount of charge SOC of the battery 23 after the end of the driving duration is estimated to be higher.

Figure 3:
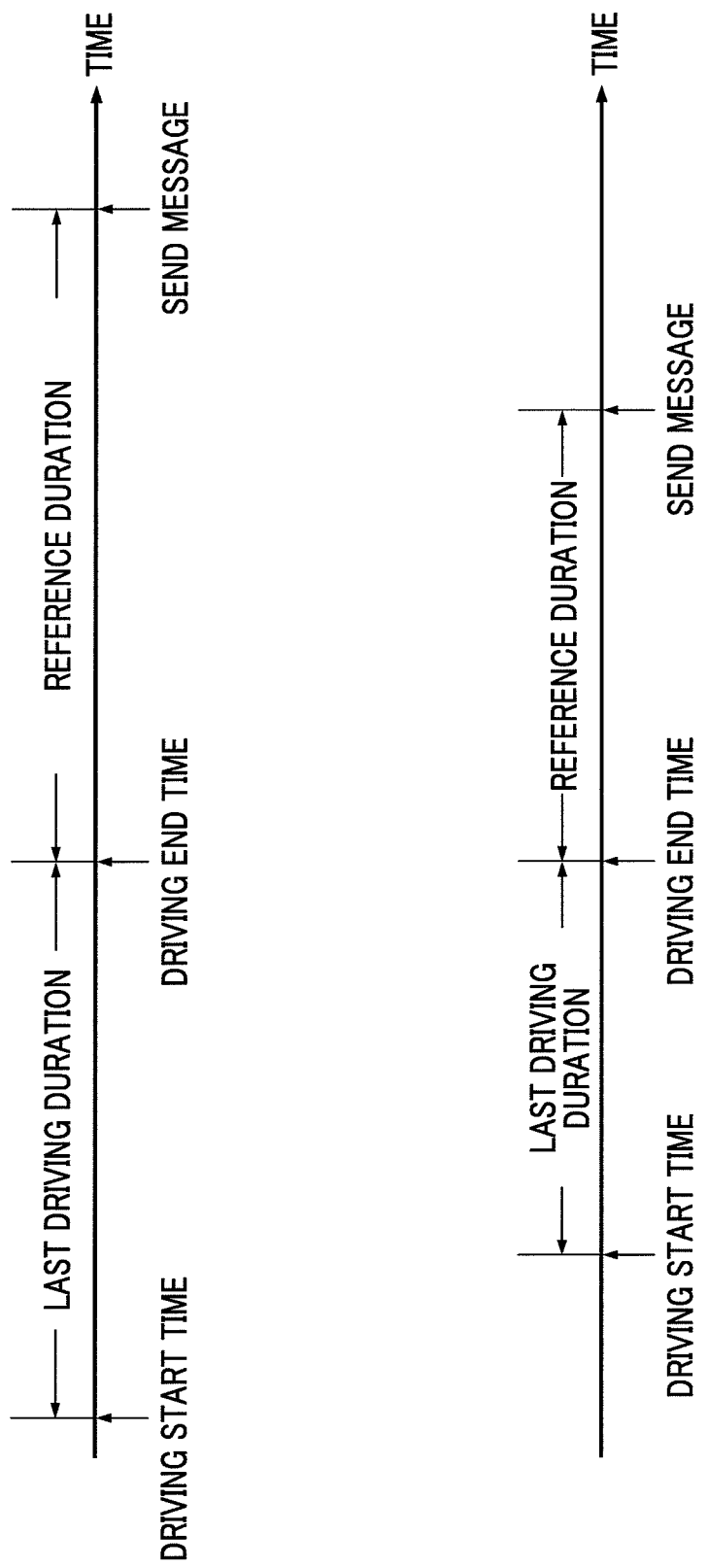
FIG. 3 is an explanatory diagram related to a reference duration and a message sending timing.

Thus, compared with the case where the last driving duration is longer as illustrated in the upper section in FIG. 3, the reference duration is set shorter in the case where the last driving duration is shorter as illustrated in the lower section in FIG. 3. Thereby, even though the end time of the last driving duration is the same, the message is sent to a corresponding contact address earlier in the latter case than in the former case.

In addition, if the surroundings (the weather, an ambient temperature, an inclination angle of a downward slope and a travel distance contained in a travel route, and the like) of the vehicle 2 during the last driving duration are identified from the vehicle information, it is acceptable that the reference duration is set under the consideration of the difference of a decrement degree of the SOC of the battery 23 related to the difference of the factor. The inclination angle of a downward slope and the travel distance contained in a travel route may be identified by using the probe information serving as the vehicle information and a map information which is stored in the database 10 and from which the inclination angle and the distance of each link constituting the route can be identified.

Further, it is acceptable to set a reference duration at a current time such that the reference duration is shorter as an elapsed time from the end time of the last driving duration of the vehicle 2 to the current time is longer. The reason thereof is based on the fact that if the elapsed time from the end time of the last driving duration of the vehicle 2 is longer, it is highly possible that the natural discharge amount of the battery 23 is higher. In the case where a factor for determining the discharge characteristic of the battery 23 (the performance, the specification or type of the battery 23, or the surroundings of the vehicle 2 after the last driving duration) is identified from the vehicle information, it is acceptable that the reference duration is set under the consideration of the difference of the discharge characteristic of the battery 23 related to the difference of the factor.

Furthermore, in the case where the SOC of the battery 23 at the end time of the last driving duration is identified or estimated from the vehicle information, it is acceptable to set the reference duration longer as the SOC becomes higher. It is also acceptable that the SOC of the battery 23 is sequentially measured by the ECU 20 and the vehicle information containing the measurement values is sent directly or indirectly to the vehicle state monitoring server 1. In the case where the factor for determining the discharge characteristic of the battery 23 can be identified from the vehicle information, it is acceptable that the SOC is estimated at the time of setting the reference duration under the consideration of the difference of the factor. It also acceptable that the reference duration is set uniform and irrelevant to the SOC of the battery 23 and the setting process of the reference duration may be omitted.

Thereafter, whether the driving stopped duration is equal to or longer than the reference duration is determined (FIG. 2/STEP 06). The time interval from the end time of the last driving duration identified from the vehicle information and the current time may be calculated as the driving stopped duration. Thereby, the vehicle information may contain only the information capable of identifying the end time of the last driving duration.

If it is determined that the driving stopped duration is equal to or longer than the reference duration (FIG. 2/STEP 06 . . . YES), a message prompting the driving of the vehicle 2 is sent to a contact address stored in the database 10 in association with the corresponding vehicular identifier (FIG. 2/STEP 08).

According thereto, the user of the vehicle 2 can access a web site identified by a URL serving as the contact address via an information terminal device such as a computer or the like, and thereafter can read or listen to the contents of the message by operating the information terminal device in a specific mode where necessary. It is possible for the user of the vehicle 2 to understand the contents of the message sent to a mail address serving as the contact address via the information terminal device. It is also possible for the user of the vehicle 2 to listen to the contents of the message sent to a telephone serving as the contact address via a telephone machine.

It is acceptable that a driving duration of the vehicle 2 required to increase the SOC of the battery 23 to a predefined value is determined as a recommended driving duration according to the level of the SOC identified or estimated from the vehicle information and a message containing the recommended driving duration is generated by the second monitoring-processing element 12.

On the other hand, if it is determined that the driving stopped duration is less than the reference duration (FIG. 2/STEP 06 . . . NO), the series of processes for the vehicle is terminated without sending the message. Thereafter, the series of processes may be repeated again.

(Effects of the Vehicle State Monitoring System of the Present Invention)

According to the vehicle state monitoring system of the present invention, if the vehicle 2 has been in a driving stopped state for the reference duration or more, a message is sent to a contact address associated with the vehicle identifier of the vehicle 2 (refer to FIG. 2). It is possible to prompt a user to take necessary actions to charge the battery by the message. As a result thereof, it is possible to reduce the possibility that the vehicle 2 has been disposed in the driving stopped state without being noticed by the user for a long duration and the performance of the battery 23 deteriorates due to the decrement of the SOC of the battery 23.

The timing for sending the message is determined according to the level of the SOC of the battery 23 identified from the vehicle information or estimated on the basis of the length of the last driving duration identified from the vehicle information (refer to FIG. 3). Accordingly, the message can be sent to a corresponding contact address at an appropriate timing in view of the level of charging necessity for preventing the performance deterioration of the battery.

In the case where the recommended driving duration necessary for preventing the performance deterioration of the battery 23 is included in the meassage, the recommended driving duration can be recognized by the user through the message. As a result thereof, it is possible to reduce the possibility that the recovery of the SOC of the battery 23 is insufficient due to a too short duration where the vehicle 2 has been driven by the user, preventing the performance of the battery 23 from being deteriorated due to the decrement of the SOC of the battery 23 in a driving stopped duration thereafter.

(Another Embodiment of the Vehicle State Monitoring System of the Present Invention)

In addition to a hybrid vehicle, the vehicle 2 may be any vehicle mounted with a battery such as an electric automobile or the like having an electric motor as a prime mover. For a vehicle configured to have the battery charged by an electric power supplied from an external power source such as a commercial power source or the like, it is acceptable to send a message to a corresponding contact address prompting to charge the battery by the electric power supplied from the external power source.

It is acceptable that the message is sent to the corresponding contact address for plural times. For example, the message is sent to the corresponding contact address for the first time after a first reference duration has elapsed from the end time (or end date) of the last driving duration, and thereafter, the message is sent to the corresponding contact address for the second time if the vehicle 2 is recognized to remain in the driving stopped state according to the vehicle information despite that a second reference duration has elapsed.

It is acceptable that a travel history, such as the frequency of driving the vehicle 2 by the user at an X day of the week is higher or the like, is recognized directly or indirectly from the vehicle information and the message is sent to a corresponding contact address by a specific available period (one day, 8 hours or the like) prior to the date where the driving possibility is high. It is also acceptable that an access history related to a contact address in the network, such as the frequency of viewing a web site by the user at an Y day of the week is higher or the like, is recognized directly or indirectly from the vehicle information and then the message is sent to the contact address by a specific available period prior to the date where the possibility of accessing the contact address by the user is high.

The invention claimed is:

1. A vehicle state monitoring server configured to monitor a state of a battery mounted in a vehicle provided with an electric motor as a prime mover, comprising:
   a database configured to store a vehicular identifier for identifying the vehicle associated with a contact address of a user of the vehicle in a communication network;

a first monitoring-processing element configured to recognize a vehicle information capable of identifying the vehicular identifier of the vehicle and a last driving stopped duration of the vehicle according to network communications; and a second monitoring-processing element configured to send a message to the contact address stored in association with the vehicular identifier of the vehicle by the database on condition that the last driving stopped duration of the vehicle is equal to or longer than a reference duration on the basis of the vehicle information recognized by the first monitoring-processing element, wherein the first monitoring-processing element is configured to recognize the vehicle information capable of identifying or estimating a remaining amount of the battery mounted in the vehicle, and the second monitoring-processing element is configured to determine the reference duration according to a level of the remaining amount of the battery of the vehicle identified or estimated from the vehicle information recognized by the first monitoring-processing element.

2. The vehicle state monitoring server according to claim 1, wherein the first monitoring-processing element is configured to recognize the vehicle information capable of identifying or estimating a remaining amount of the battery configured to be charged by the driving of the vehicle, and the second monitoring-processing element is configured to determine a driving duration of the vehicle required to increase the remaining amount of the battery to a predefined value as a recommended driving duration according to the level of the remaining amount of the battery identified or estimated from the vehicle information recognized by the first monitoring-processing element, and to send the message containing the recommended driving duration to the contact address stored in association with the vehicular identifier of the vehicle by the database.

3. The vehicle state monitoring server according to claim 1, wherein the message prompts the user of the vehicle to drive the vehicle.

4. The vehicle state monitoring server according to claim 1, wherein the second monitoring-processing element is configured to compare the last driving stopped duration of the vehicle and the reference duration, and to send the message to the contact address stored in association with the vehicular identifier of the vehicle by the database once the second monitoring-processing element determines that the last driving stopped duration of the vehicle is longer than or equal to the reference duration based on the comparison of the last driving stopped duration of the vehicle and the reference duration.

5. The vehicle state monitoring server according to claim 1, wherein the second monitoring-processing element is configured to send the message to the contact address stored in association with the vehicular identifier of the vehicle by the database once the second monitoring-processing element determines that the last driving stopped duration of the vehicle is longer than or equal to the reference duration.

6. The vehicle state monitoring server according to claim 1, wherein the last driving stopped duration of the vehicle is a duration of time beginning with a vehicle ignition switch being switched off and ending at a current time without the vehicle ignition switch being switched on.

7. The vehicle state monitoring server according to claim 1, wherein the last driving stopped duration of the vehicle is a duration of time ending at a current time and during which movement of the vehicle is less than a threshold value.

8. The vehicle state monitoring server according to claim 1, wherein the first monitoring-processing element is configured to recognize the vehicle information capable of identifying or estimating a last driving duration of the vehicle, and the second monitoring-processing element is configured to determine the reference duration based on the last driving duration of the vehicle, wherein the reference duration is determined to increase as the last driving duration of the vehicle increases.

9. A vehicle state monitoring system comprising a vehicle state monitoring server configured to monitor a state of a battery mounted in a vehicle provided with an electric motor as a prime mover and a vehicle control unit mounted in the vehicle, the vehicle state monitoring server including a database configured to store a vehicular identifier for identifying the vehicle associated with a contact address of a user of the vehicle in a communication network;

a first monitoring-processing element configured to recognize a vehicle information capable of identifying the vehicular identifier of the vehicle and a last driving stopped duration of the vehicle according to network communications; and a second monitoring-processing element configured to send a message to the contact address stored in association with the vehicular identifier of the vehicle by the database on condition that the last driving stopped duration of the vehicle is equal to or longer than a reference duration on the basis of the vehicle information recognized by the first monitoring-processing element, wherein the first monitoring-processing element is configured to recognize the vehicle information capable of identifying or estimating a remaining amount of the battery mounted in the vehicle, and the second monitoring-processing element is configured to determine the reference duration according to the level of the remaining amount of the battery of the vehicle identified or estimated from the vehicle information recognized by the first monitoring-processing element.

10. The vehicle state monitoring system according to claim 9, wherein the first monitoring-processing element is configured to recognize the vehicle information capable of identifying or estimating a remaining amount of the battery configured to be charged according to the driving of the vehicle, and the second monitoring-processing element is configured to determine a driving duration of the vehicle required to increase the remaining amount of the battery to a predefined value as a recommended driving duration according to the level of the remaining amount of the battery identified or estimated from the vehicle information recognized by the first monitoring-processing element, and to send the message containing the recommended driving duration to the contact address stored in association with the vehicular identifier of the vehicle by the database.

11. The vehicle state monitoring system according to claim 9, wherein the message prompts the user of the vehicle to drive the vehicle.

12. The vehicle state monitoring system according to claim 9, wherein the second monitoring-processing element is configured to compare the last driving stopped duration of the vehicle and the reference duration, and to send the message to the contact address stored in association with the vehicular identifier of the vehicle by the database once the second monitoring-processing element determines that the last driving stopped duration of the vehicle is longer than or equal to the reference duration based on the comparison of the last driving stopped duration of the vehicle and the reference duration.

13. The vehicle state monitoring system according to claim 9, wherein the second monitoring-processing element is configured to send the message to the contact address stored in association with the vehicular identifier of the vehicle by the database once the second monitoring-processing element determines that the last driving stopped duration of the vehicle is longer than or equal to the reference duration.

14. The vehicle state monitoring system according to claim 9, wherein the last driving stopped duration of the vehicle is a duration of time beginning with a vehicle ignition switch being switched off and ending at a current time without the vehicle ignition switch being switched on.

15. The vehicle state monitoring system according to claim 9, wherein the last driving stopped duration of the vehicle is a duration of time ending at a current time and during which movement of the vehicle is less than a threshold value.

16. The vehicle state monitoring system according to claim 9, wherein
the first monitoring-processing element is configured to recognize the vehicle information capable of identifying or estimating a last driving duration of the vehicle, and
the second monitoring-processing element is configured to determine the reference duration based on the last driving duration of the vehicle, wherein the reference duration is determined to increase as the last driving duration of the vehicle increases.

* * * * *